J. S. McCHESNEY.
SEAL FOR PACKAGES.
APPLICATION FILED DEC. 16, 1918.
1,408,897.
Patented Mar. 7, 1922.
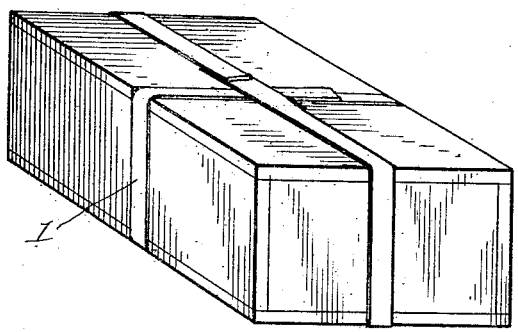
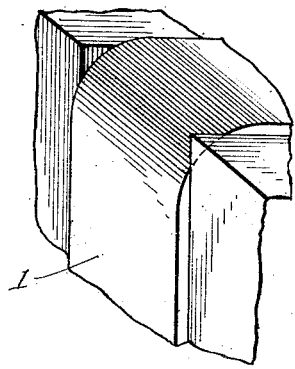
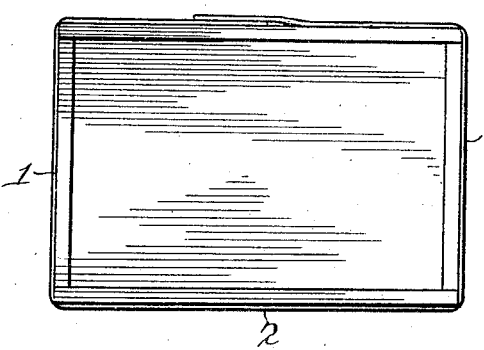
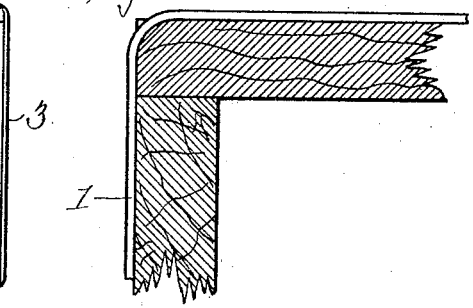
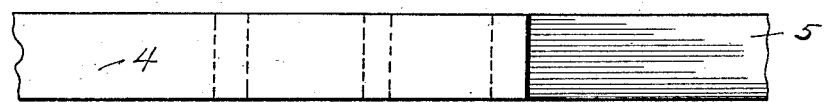
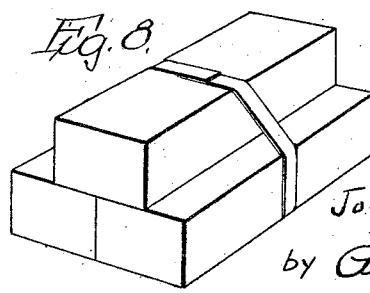
INVENTOR:
John Sherman McChesney
by Albert Scheith ATTORNEY.

UNITED STATES PATENT OFFICE.

JOHN SHERMAN McCHESNEY, OF CHICAGO, ILLINOIS.

SEAL FOR PACKAGES.

1,408,897. Specification of Letters Patent. Patented Mar. 7, 1922.

Application filed December 16, 1918. Serial No. 266,955.

*To all whom it may concern:*

Be it known that I, JOHN SHERMAN McCHESNEY, a citizen of the United States, residing at Chicago, in the county of Cook and State of Illinois, have invented certain new and useful Improvements in a Seal for Packages; and I do hereby declare the following to be a full, clear, and exact description of the invention, such as will enable others skilled in the art to which it appertains to make and use the same.

My invention relates to bands or seals for boxes or packages, bundles or the like, its general objects including seals or bands of this kind so constituted that they cannot be removed from the object or objects encircled thereby without injury to either the bands or seals or to the objects encircled by the same.

In one of its general objects, my invention aims to provide an assembling or reinforcing band encircling an object or a group of objects with such a tension as to prevent a separational movement of portions of whatever is encircled by the band; and to provide a band of this kind which cannot readily be slipped off the object or group of objects encircled by it. Another object is to provide such an assembling or reinforcing band made from a flat strip or other wire and having the end portions of the original strip so secured to each other that the resulting joint cannot be pried open thereby even with the use of tools or by forcible engagement with other objects, that this joint will project so inappreciably beyond the surface of the package or other object or objects encircled by the band as not to interfere with the piling thereof in tiers, and to have the joint stronger than the remainder of the band and so made that the joined portions cannot be unjoined by the application of a hot iron or the like.

In another aspect, my invention aims to provide one or more bands encircling an object or group of objects and adapted to limit access to what is inclosed by the sealing band, so that the contents may not be removed without visually disclosing the tampering. Furthermore, my invention aims to provide a band or seal for an object or group of objects so tensioned or contracted as to indent portions of what is encircled by the band, or otherwise to contract the encircled object or objects substantially along the banding plane, thereby preventing the band from being slipped off what is encircled by it. For this latter purpose, my invention desirably aims to provide a band formed from a flat strip or other wire having relatively square edges adapted to indent portions of what is encircled by the band in such a manner as to form shoulders engaging edge portions of the band to prevent a transverse movement of the band with respect to what it encircles, and desirably to effect this indenting to such an extent that an appreciably loosening of the band with respect to what it encircles will still maintain the indenting portions of the band in engaging relations with the shoulder formations produced thereby.

In another aspect my invention aims to provide bands or peripheral seals disposed in groups about a given object or plurality of objects and so secured to one another as to prevent one another from being moved with respect to what is encircled by the bands or seals, regardless of any contraction of the encircled object or objects, or of any indenting of shoulder formations on the latter. More particularly, my invention aims to provide bands or peripheral seals of the general class described, in which the ends of the wire or strip of which each is formed are integrally united to each other, and in which portions of conjointly used bands are likewise integrally secured to each other. Still other objects will appear from the following specification, and from the accompanying drawings, which drawings are presented merely as showing a few desirable embodiments of my invention. In the drawings—

Fig. 1 is a perspective view of a box banded in two directions with sealing bands embodying my invention.

Fig. 2 is an enlarged end view of such a box when banded in one direction only.

Fig. 3 is a fragmentary sectional view of the same box taken along the nearer edge of the sealing band.

Fig. 4 is an enlarged perspective view of a part of the band, showing the joining of the ends of the latter.

Fig. 5 is a central and longitudinal vertical section through Fig. 4.

Fig. 6 is a plan view of the portions of the band shown in Fig. 4.

Fig. 7 is an enlarged perspective view showing the indenting of a band into an edge of a box.

Fig. 8 is a perspective view of a bundle of boxes banded according to my invention.

Fig. 9 is a fragmentary perspective view of a stack of sheet material banded according to my invention.

In applying my invention to the box of Fig. 1, I encircle the box in two relatively transverse directions with metal bands, each band being desirably made of a flat steel strip of a sufficient length so that its free ends may overlap flatwise, as shown in the drawings. Each band is tightened to such a tension that the band will not only be drawn tightly against at least three sides of the box along the band portions marked 1, 2 and 3 in Fig. 2, but so that the band will also be bent around the edges of the angularly sectioned box with a tension sufficient to cause the band to indent the box at these corners as shown in Figs. 3 and 7.

After tensioning each band to this extent along three sides of the box and around all four consecutive edges of the box, the band is maintained under tension while the end portions are welded to each other in overlapped relation and with the tip of each end extending in an opposite direction from the other tip. This, as well as the aforesaid tensioning can all be accomplished by means of the wire banding machine disclosed in my copending application #248836 filed Aug. 8, 1918, or by means of the package banding machine of my copending application, although I do not wish to be limited to any particular means for effectively applying the banding seal of my invention. In securing the ends of the band to each other, I desirably do so at a number of portions spaced longitudinally of the band, and desirably include among the relatively secured portions the entire width of the extreme tip of the outer of the two overlapped ends. For example, the overlapped band portions may be secured to each other along lines or strips extending for the entire width of the band contiguous to each free tip of the latter and also along a similar strip disposed between two tip portions, as shown in Figs. 4, 5 and 6. While I do not wish to be limited to all of these particular locations, I prefer to include a uniting of the overlapped band portions along the entire width of the outer tip 4 of the overlapped parts, thereby preventing this outer tip from projecting away from the band portion 5, as any gapping at this point might permit the insertion of a tool or prying the overlapped band portions apart, or might likewise cause the tip 4 to catch on other objects when the package is being handled. Furthermore, I desirably unite the overlapping band portions to each other by means of a welding process, so that the adjoined parts will be integrally united with each other instead of being connected by a solder or other interposed material which might be softened and loosened by the application of a heated iron to the band.

Consequently, when my seal is applied to the box (which may be done in a very short time by using either of the appliances disclosed in my said copending applications) the joint in the band will be mechanically stronger than the remainder of the band, so that any attempt to rupture the band will first tear it along some other portion and will therefore prevent the overlapped parts from being disconnected and reconnected by someone who might want to tamper with the contents of the package. At the same time, the corner portions projecting alongside the band at the edges of the box, as shown in Fig. 7, will effectively prevent the band from being slid off the box.

In applying such bands, the band portions leading from the joint may need to be spaced slightly from the adjacent side of the banded object, thereby tending to leave a gap when the band-joining appliance is removed, but in practice this gapping is easily rendered negligible if the band is initially tensioned so as to indent the corners of the box somewhat more than would be necessary to anchor the band against transverse sliding.

To insure an effective engagement of the edge portions of the band with the shoulder formations indented thereby in whatever is encircled by the band, I desirably use wire or strip of angular cross-section, and tension this strip to such an extension before making the weld joints that a moderate relaxing of the tension will still leave edge portions of the band seated in the grooves indented by the band. This is highly desirable, both because a portion of the welding tool has to be interposed initially between the overlapped strip ends, so that the thickness of this tool portion is included with the object about which the band is tensioned, and also because a shrinkage of the encircled object may tend to loosen the band. However, the tensioning must not be carried to an extent likely to overstrain the wire or strip, hence the tension is desirably predetermined to a definite degree, which is readily done by either of the appliances of my said copending applications.

However, while I have shown and described the sealing band of my invention as applied to a box or rectangular section, I do not wish to be limited to this particular employment of my invention, nor to the precise details of the construction and arrangement above described, it being obvious that these might be varied in many respects without departing from the spirit of my invention. For example, my invention may be applied with equal facility to the banding of bundles or groups of boxes or other objects, as shown for example in Fig. 8, in which case the tendency of the individual objects to spring apart at their ends will aid any indenting or other contracting at the band in preventing the band from being slipped off. Or, it may be used with such articles as cardboard or paper currency, where the tensioning of the band or seal would tend to bow the opposite faces of the package by compressing its edge portions, as in Fig. 9, rather than to indent the edges.

It will also be obvious that the principle is the same regardless of whether or not my invention is applied to a single package or to a group of packages or other objects, hence it is to be understood that the term "package" in the appended claim broadly includes whatever is encircled by the metal band; also that the terms wire and strip are used in the generic sense in which either may include a variety of cross-sections.

I claim as my invention:

A seal or band for a package, comprising a flat metal strip encircling the package with a tension sufficient to indent the resulting band into portions of the package, one end portion of the metal strip being lapped over the other end thereof with the tip of each end portion contiguous to a portion of the strip spaced from the other tip, the outer of the overlapping portions being welded at its tip and for the full width of the latter to the strip portion overlapped by it.

Signed at Chicago, December 14th, 1918.

JOHN SHERMAN McCHESNEY.